US009380482B2

(12) United States Patent
Huang (10) Patent No.: US 9,380,482 B2
(45) Date of Patent: Jun. 28, 2016

(54) METHOD AND SYSTEM FOR PROCESSING MEASUREMENT EVENT IN MULTI-CARRIER SYSTEM (75) Inventor: Yada Huang, Shenzhen (CN)

(73) Assignee: ZTE CORPORATION, Shenzhen, Guangdong Province (CN)

(*) Notice: Subject to any disclaimer, the term of this patent is extended or adjusted under 35 U.S.C. 154(b) by 734 days.

(21) Appl. No.: 13/696,295

(22) PCT Filed: Oct. 22, 2010

(86) PCT No.: PCT/CN2010/077990
§ 371 (c)(1),
(2), (4) Date: Nov. 5, 2012

(87) PCT Pub. No.: WO2011/137632
PCT Pub. Date: Nov. 10, 2011

(65) Prior Publication Data
US 2013/0058244 A1 Mar. 7, 2013

(30) Foreign Application Priority Data
May 6, 2010 (CN) .......................... 2010 1 0178126

(51) Int. Cl.
H04W 24/10 (2009.01)
H04W 36/14 (2009.01)
H04W 36/30 (2009.01)
H04W 72/08 (2009.01)

(52) U.S. Cl.
CPC ............. *H04W 24/10* (2013.01); *H04W 36/14* (2013.01); *H04W 36/30* (2013.01); *H04W 72/082* (2013.01)

(58) Field of Classification Search
CPC .... H04W 36/14; H04W 36/30; H04W 72/082
See application file for complete search history.

(56) References Cited

U.S. PATENT DOCUMENTS

2001/0055297 A1* 12/2001 Benveniste .................... 370/349
2010/0062717 A1* 3/2010 Brisebois ............ H04W 72/085
455/63.1

(Continued)

FOREIGN PATENT DOCUMENTS

CN 101127749 A 2/2008
CN 101155376 A 4/2008
CN 101605352 A 12/2009

OTHER PUBLICATIONS

International Search Report (Form PCT/ISA/210) for PCT/CN2010/077990, Feb. 17, 2011.

*Primary Examiner* — Xavier Szewai Wong
*Assistant Examiner* — Edem A. Ayikoe
(74) *Attorney, Agent, or Firm* — Koppel, Patrick, Heybl & Philpott (57) ABSTRACT The present invention provides a method and a system for processing a measurement event in a multi-carrier system. The method for processing a measurement event in a multi-carrier system comprises: a mobile terminal receives a measurement assignment configured and transmitted by a network side device (S302); the mobile terminal determines a serving cell and a neighbor cell corresponding to the received measurement assignment (S304); the mobile terminal measures the determined serving cell and neighbor cell (S306); and when a measurement result meets a report condition of a measurement event corresponding to the received measurement assignment, the mobile terminal reports the measurement result (S308). By configuring measurement events and assignments for different serving cells, the present invention solves the problem that a measurement event cannot distinguish between a primary serving cell and a secondary serving cell in the conventional art, thus the mobile terminal can implement measurement and reporting under the configuration of multiple serving cells.

17 Claims, 4 Drawing Sheets

(56) References Cited

U.S. PATENT DOCUMENTS

| | | | |
|---|---|---|---|
| 2010/0069065 A1* | 3/2010 | Sambhwani | H04J 11/0093 455/434 |
| 2010/0130218 A1* | 5/2010 | Zhang et al. | 455/450 |
| 2010/0233962 A1* | 9/2010 | Johansson | H04W 52/343 455/63.1 |
| 2011/0070888 A1* | 3/2011 | Iwamura et al. | 455/435.3 |
| 2012/0003943 A1* | 1/2012 | Marinier et al. | 455/73 |
| 2012/0076041 A1* | 3/2012 | Jung et al. | 370/252 |

* cited by examiner

United States Patent US 9,380,482 B2

METHOD AND SYSTEM FOR PROCESSING MEASUREMENT EVENT IN MULTI-CARRIER SYSTEM

This is a National Stage Application of PCT/CN2010/077990 filed Oct. 22, 2010, published as WO 2011/137632 A1, and claiming priority from CN201010178126.X filed May 6, 2010.

FIELD OF THE INVENTION

The present invention relates to the communication field, in particular to a method and system for processing a measurement event in a multi-carrier system.

BACKGROUND OF THE INVENTION

In the mobile communication system, in order to meet the requirement of mobility, after User Equipment (UE) establishes a connection with a network in a certain cell, the UE still needs to measure the signal quality of the serving cell and the neighbour cell, so as to select an appropriate cell for handover. Taking EUTRAN (Evolved Universal Terrestrial Radio Access Network) as an example, the specific process of the measurement performed by the UE in the connection state is: the network side transmits a measurement control message to the UE, wherein the measurement control message comprises Measurement Identity (MID), event type, measurement object, and attributes that need to be measured; the UE performs parameter initialization according to the measurement identity in the measurement control message, and acquires the attributes and measurement result of each measurement object among all the measurement objects in the measurement control message; the UE performs event evaluation for the measurement result of each measurement object according to the initialized parameters or a predetermined offset (offset) value, and determines, through the evaluation, the measurement objects that meet the trigger conditions of the measurement events and have a duration greater than or equal to a Time To Trigger (TTT) among all the measurement objects; the UE places these measurement objects (at this time, the measurement objects have already been corresponded to cells) which meet a event trigger condition, into a cell list (cellsTriggeredList) of the measurement identity corresponding to the event; and the UE generates a measurement report according to the measurement results of the determined measurement objects, and transmits the measurement report to the network side, the measurement objects contained in the measurement report are all acquired from the cell list of the measurement identity corresponding to the event.

In the mobile communication system, frequency or a cell set at the frequency forms the unit of the measurement object, and the measurement configuration consists of measurement assignments. Each measurement assignment comprises one measurement identity, one measurement object and one reporting configuration (e.g., event triggering or periodical report). Herein the measurement identity indicates the corresponding measurement object and the corresponding reporting configuration. In the LTE (Long Term Evolution) system, one measurement object corresponds to one frequency, and the reporting configuration can define event report and periodic report which specifically comprise event report type or periodical report type and the corresponding parameters, for example, an event typically comprises event trigger condition, exit condition, event specific offset (Thresh), event hysteresis parameter (Hys), duration of event trigger condition, event offset (Offset) and so on.

In order to meet the mobility requirements of the UE under the connection state, it is required that the UE measures the serving cell and the neighbour cell and reports the measurement objects meeting the event trigger condition. At present, some measurement events for the serving cell have been defined, for example, defining the trigger condition for the measurement event as the signal quality of the serving cell being higher than a predetermined offset (A1 event), or as the signal quality of the serving cell being lower than a predetermined offset (A2 event); as to the measurement event of the neighbour cell, for example, defining the trigger condition of the measurement event as the signal quality of the neighbour cell being higher than a certain offset (A4 event), or as the signal quality of the neighbour cell being higher than the signal quality of the current serving cell by a predetermined offset (A3 event).

To measure the measurement object, different systems use different measurement methods, which all reflect signal quality of the cell. In the LTE, what the UE measures is Reference Signal Received Power (RSRP, the unit thereof is dBm) or Reference Signal Received Quality (RSRQ, the unit thereof is dB). In the WCDMA, what the UE measures is Received Signal Code Power (RSCP, the unit thereof is dBm) of the common pilot channel or Ec/No (indicating the ratio of the energy of each chip on each code channel after the transmitter spreading the spectrum versus the power spectral density of the band limited white noise) of the common pilot channel, which takes dB as the unit. When comparing the signal qualities of different cells, the UE needs to compare the measurement results of the same type. When evaluating the measurement object meets the event trigger condition (taking the A3 event defined in the LTE as an example): the signal quality of the neighbour cell is higher than the signal quality of the serving cell by a certain offset, the specific mathematical description of which is Mn+Ofn+Ocn−Hys>Ms+Ofs+Ocs+Off, wherein the parameters comprise RSRP or RSRQ (the serving cell is Ms, and the neighbour cell is Mn) measured by the UE, and also comprise frequency specific offset (wherein the frequency of the serving cell is Ofs and the frequency of the neighbour cell is Ofs), cell specific offset (wherein the frequency of the serving cell is Ocs and the frequency of the neighbour cell is Ocn), Off is offset, Hys is hysteresis.

Figure 1:
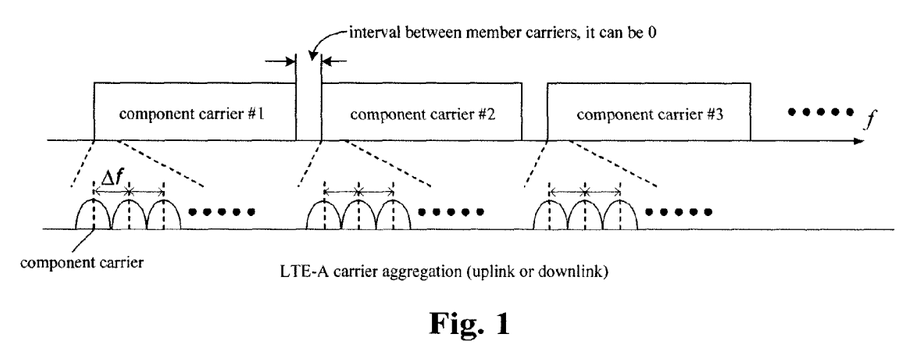
FIG. 1 is a schematic diagram of the LTE-A carrier aggregation according to the related art.

In order to meet the demands for greater bandwidth, the LTE-A (LTE Advance, advanced long-term evolution) proposes to use the method of carrier aggregation to achieve greater bandwidth, and at this time, the UE can work in multiple continuous or discontinuous carriers (each carrier is referred to as Component Carrier), as shown in FIG. 1. One of the component carriers is a Primary Component Carrier (PCC), and other carriers are Secondary Component Carriers (SCC), wherein in each component carrier, there is a serving cell providing services for the UE, the serving cell on the PCC is a Primary Serving Cell (Pcell), the serving cell on the SCC is a Secondary Serving Cell (Scell). In a single-carrier system, since there is only one serving cell, there is no need to indicate the serving cell in the existing measurement configurations (measurement object, measurement identity, reporting configuration). But for a multi-carrier system, since there may be multiple serving cells, and different measurement assignments will be configured in correspondence with different serving cells, the related art above cannot meet the requirements, namely the existing measurement configurations cannot distinguish between a primary serving cell and a secondary serving cell.

SUMMARY OF THE INVENTION

The present invention is provided aiming at the problem that a measurement event cannot distinguish between a primary serving cell and a secondary serving cell in the related art. Thus, the present invention provides a method and a system for processing a measurement event in a multi-carrier system.

According to one aspect of the present invention, a method for processing a measurement event in a multi-carrier system is provided, which comprises the steps that: a mobile terminal receives a measurement assignment which is configured and transmitted by a network side device; the mobile terminal determines a neighbour cell and a serving cell corresponding to the received measurement assignment; the mobile terminal measures the determined neighbour cell and serving cell; and when a measurement result meets a report condition of a measurement event corresponding to the received measurement assignment, the mobile terminal reports the measurement result.

Preferably, the serving cell is a primary serving cell or a secondary serving cell.

Preferably, the step of the mobile terminal determining a neighbour cell and a serving cell corresponding to the received measurement assignment comprises: when a measurement event corresponding to the measurement assignment is a first measurement event, the serving cell corresponding to the measurement assignment is a primary serving cell, wherein the first measurement event can only be identified by an LTE-A device; and when a measurement event corresponding to the measurement assignment is a second measurement event and the mobile terminal works in the multi-carrier aggregation state, the serving cell corresponding to the measurement assignment is a secondary serving cell, wherein the second measurement event can be identified by an LTE device and an LTE-A device.

Preferably, a measurement object of the measurement assignment corresponding to the second measurement event is at the same frequency with the secondary serving cell; and when a measurement event corresponding to the measurement assignment is a second measurement event and the mobile terminal works in the single carrier aggregation state, the serving cell corresponding to the measurement assignment is a primary serving cell.

Preferably, the method further comprises the steps that: the mobile terminal receives a reconfiguration message transmitted by the network side device; and when the mobile terminal is configured from multi-carrier to single carrier, the measurement assignment corresponding to the second measurement event is deleted; or when the mobile terminal is configured from single carrier to multi-carrier, a measurement assignment corresponding to the second measurement event is added according to the reconfiguration message indication.

Preferably, after the mobile terminal receives a reconfiguration message transmitted by the network side device, the method further comprises: when the mobile terminal is configured from multi-carrier to single carrier, the second measurement event is modified to the first measurement event.

Preferably, the step of the mobile terminal determining a neighbour cell and a serving cell corresponding to the received measurement assignment comprises: when the received measurement assignment is a measurement assignment of a first kind, the serving cell corresponding to the measurement assignment is a primary serving cell; when the received measurement assignment is a measurement assignment of a second kind, the serving cell corresponding to the measurement assignment is a secondary serving cell, wherein the network side device configures the measurement assignment of the first kind related to the primary serving cell and the measurement assignment of the second kind related to the secondary serving cell according to the measurement event, the measurement event corresponding to the measurement assignment of the first kind can be identified by an LTE device and an LTE-A device, and the measurement event corresponding to the measurement assignment of the second kind can only be identified by an LTE-A device.

Preferably, the method further comprises the steps that: the mobile terminal receives a reconfiguration message transmitted by the network side device; and when the mobile terminal is configured from multi-carrier to single carrier, the measurement assignment of the second kind is deleted; or when the mobile terminal is configured from single carrier to multi-carrier, the measurement assignment of the second kind is added according to the reconfiguration message indication.

Preferably, in the step of the mobile terminal determining a neighbour cell and a serving cell corresponding to the received measurement assignment: when a measurement event corresponding to the measurement assignment is a third measurement event, the serving cell corresponding to the measurement assignment is a primary serving cell, wherein the third measurement event can only be identified by an LTE-A device; when a measurement event corresponding to the measurement assignment is a fourth measurement event, and a primary serving cell or a secondary serving cell exists on the frequency at which a measurement object of the measurement assignment is, the serving cell corresponding to the measurement assignment is the existing primary serving cell or secondary serving cell; when a measurement event corresponding to the measurement assignment is a fourth measurement event, and the primary serving cell and the secondary serving cell do not exist on the frequency at which a measurement object of the measurement assignment is, the serving cell corresponding to the measurement assignment is the primary serving cell, wherein the fourth measurement event can be identified by an LTE device and an LTE-A device.

Preferably, in the step of the mobile terminal determining a neighbour cell and a serving cell corresponding to the received measurement assignment: when a measurement event corresponding to the measurement assignment is a fifth measurement event, the serving cell corresponding to the measurement assignment is a primary serving cell, wherein the fifth measurement event can be identified by an LTE device and a LTE-A device; and when a measurement event corresponding to the measurement assignment is a sixth measurement event, the serving cell corresponding to the measurement assignment is a secondary serving cell, wherein the sixth measurement event can only be identified by an LTE-A device.

According to another aspect of the present invention, a method for processing a measurement event is provided, which comprises the steps that: a mobile terminal measures a wireless signal of a neighbour cell and a serving cell corresponding to a measurement event, wherein the serving cell corresponding to the measurement event is a secondary serving cell, and the secondary serving cell and the neighbour cell are at the same frequency; when the wireless signal quality of the neighbour cell is higher than the wireless signal quality of the serving cell, the measurement event is triggered.

Preferably, after the measurement event is triggered, the method further comprises: when a measurement result of the measurement event meets a report condition, the mobile terminal reports the measurement result.

According to a further aspect of the present invention, a multi-carrier system is provided, which comprises: a network side device and a mobile terminal, wherein the network side device comprises: a configuring module, which is configured to configure a measurement assignment of a primary serving cell and a measurement assignment of a secondary serving cell; a first transmitting module, which is configured to transmit the configured measurement assignments to a mobile terminal, for the mobile terminal to measure and report. The mobile terminal comprises: a receiving module, which is configured to receive the configured measurement assignments transmitted by the first transmitting module; an acquiring module, which is configured to acquire a neighbour cell and a serving cell corresponding to the received measurement assignments; a measuring module, which is configured to measure the determined neighbour cell and serving cell; and a second transmitting module, which is configured to report a measurement result when the measurement result meets a report condition of the event corresponding to the received measurement assignment.

The present invention has the following advantageous effects:

1) by configuring different measurement events and measurement assignments for the primary serving cell and the secondary serving cell, the mobile terminal can determine the serving cell corresponding to the measurement assignment, thus the mobile terminal can implement measurement and reporting under the configuration of multiple serving cells; and 2) by expanding the existing measurement configuration, the impact on the LTE protocol is reduced, the modification to the protocol and the processing on the terminal are simplified as much as possible, and at the same time, the backward compatibility of the LTE system is also ensured.

BRIEF DESCRIPTION OF THE DRAWINGS

The drawings illustrated here provide a further understanding of the present invention and form a part of the present application. The exemplary embodiments and the description thereof are used to explain the present invention without unduly limiting the scope of the present invention. In the drawings.

DETAILED DESCRIPTION OF EMBODIMENTS

The present invention will be described in detail hereinafter with reference to the drawings and in conjunction with the embodiments. It should be noted that the embodiments in the present application and the features in the embodiments can be combined with each other if there is no conflict.

Figure 2:
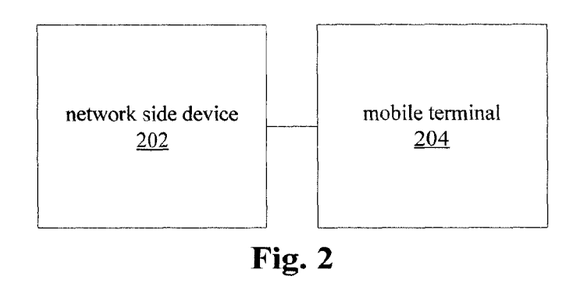
FIG. 2 is a schematic diagram of a multi-carrier system according to an embodiment of the present invention.

FIG. 2 is a schematic diagram of a multi-carrier system according to an embodiment of the present invention. As shown in FIG. 2, the multi-carrier system of the embodiment of the present invention comprises: a network side device 202 and a mobile terminal 204. Preferably, the network side device 202 is a base station, and the UE is in the connection state, in a carrier aggregation cell dominated by the base station.

The embodiment of the present invention mainly makes improvements to the configuration and processing of the measurement event between the network side device 202 and the mobile terminal 204. The method for processing a measurement event according to an embodiment of the present invention will be described hereinafter in conjunction with the drawings and the embodiments.

Figure 3:
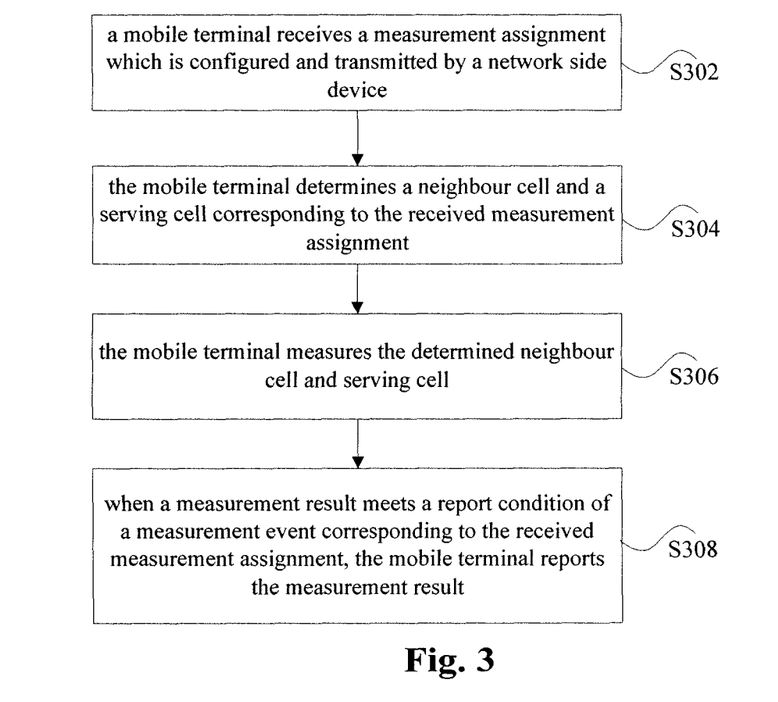
FIG. 3 is a flow chart of a method for processing a measurement event in a multi-carrier system according to an embodiment of the present invention.

FIG. 3 is a flow chart of a method for processing a measurement event in a multi-carrier system according to an embodiment of the present invention. As shown in FIG. 3, the method for processing a measurement event in a multi-carrier system according to an embodiment of the present invention comprises the following steps:

S302, a mobile terminal receives a measurement assignment which is configured and transmitted by a network side device;

S304, the mobile terminal determines a cell (or cells) to be measured corresponding to the received measurement assignment, wherein the cell(s) to be measured is a serving cell, or a serving cell and a neighbour cell. For example, in the present preferred embodiment, the cells to be measured can be a neighbour cell and a serving cell;

S306, the mobile terminal measures the acquired cell to be measured; and

S308, when the measurement result meets a report condition of the measurement event corresponding to the received measurement assignment, the mobile terminal reports the measurement result.

In the traditional art, as single carrier only relates to one serving cell, the relevant measurement event is only related to the serving cell. However, after the introduction of the carrier aggregation technology, the related art cannot meet the requirements, namely the existing measurement configuration cannot distinguish whether the corresponding serving cell is a primary serving cell or a secondary serving cell. Looking back to the embodiment of the present invention, by configuring different measurement events and measurement assignments for the primary serving cell and the secondary serving cell, the mobile terminal can determine the serving cell corresponding to the measurement assignment, thus the mobile terminal can implement measurement and reporting under the configuration of multiple serving cells.

Preferably, the network side device transmits the measurement configuration to each mobile terminal through a dedicated signaling.

Preferably, the serving cell is a primary serving cell or a secondary serving cell.

Preferably, before measuring the neighbour cell and the serving cell, the mobile terminal consults with the network side and configures different measurement events and the corresponding measurement assignments for the primary serving cell and the secondary serving cell. In the present preferred embodiment, the mobile terminal can determine the serving cell corresponding to the measurement assignment and/or measurement event, thus the mobile terminal can implement measurement and reporting under the configuration of multiple serving cells.

During the mobile terminal determining a cell to be measured corresponding to the received measurement assignment: when a measurement event corresponding to the measurement assignment is a first measurement event, the serving cell corresponding to the measurement assignment is a primary serving cell, wherein the first measurement event can only be identified by an LTE-A device; and when a measurement event corresponding to the measurement assignment is a second measurement event and the mobile terminal works in the multi-carrier aggregation state, the serving cell corresponding to the measurement assignment is a secondary serving cell, wherein the second measurement event can be identified by an LTE device and an LTE-A device.

Preferably, a measurement object of the measurement assignment corresponding to the second measurement event is at the same frequency with the secondary serving cell; and when a measurement event corresponding to the measurement assignment is a second measurement event and the mobile terminal works in the single carrier aggregation state, the serving cell corresponding to the measurement assignment is a primary serving cell.

Preferably, the method further comprises the steps that: the mobile terminal receives a reconfiguration message transmitted by the network side device; and when the mobile terminal is configured from multi-carrier to single carrier, the measurement assignment corresponding to the second measurement event is deleted; or when the mobile terminal is configured from single carrier to multi-carrier, the measurement assignment corresponding to the second measurement event is added according to the reconfiguration message indication.

Preferably, after the mobile terminal receives a reconfiguration message transmitted by the network side device, the mobile terminal performs a handover according to the reconfiguration message. When the mobile terminal is configured from multi-carrier to single carrier, the second measurement event is modified to the first measurement event.

Through the above manners, the existing measurement event is expanded, the impact on the LTE protocol is reduced, the modification to the protocol and the processing on the terminal are simplified as much as possible, and at the same time, the backward compatibility of the LTE system is also ensured.

Preferably, during the mobile terminal determining a cell to be measured corresponding to the received measurement assignment: when the received measurement assignment is a measurement assignment of a first kind, the serving cell corresponding to the measurement assignment is a primary serving cell; when the received measurement assignment is a measurement assignment of a second kind, the serving cell corresponding to the measurement assignment is a secondary serving cell; wherein the network side device configures the measurement assignment of the first kind related to the primary serving cell and the measurement assignment of the second kind related to the secondary serving cell according to the measurement event, the measurement event corresponding to the measurement assignment of the first kind can be identified by an LTE device and an LTE-A device, and the measurement event corresponding to the measurement assignment can only be identified by an LTE-A device.

Preferably, under the situation that the received measurement assignment is the measurement assignment of the first kind or the measurement assignment of the second kind, the method further comprises: the mobile terminal receives a reconfiguration message transmitted by the network side device; and when the mobile terminal is configured from multi-carrier to single carrier, the measurement assignment of the second kind is deleted; or when the mobile terminal is configured from single carrier to multi-carrier, the measurement assignment of the second kind is added according to the reconfiguration message indication.

Preferably, during the mobile terminal determining a cell to be measured corresponding to the received measurement assignment: when a measurement event corresponding to the measurement assignment is a third measurement event, the serving cell corresponding to the measurement assignment is a primary serving cell, wherein the third measurement event can only be identified by an LTE-A device; when a measurement event corresponding to the measurement assignment is a fourth measurement event, and a primary serving cell or a secondary serving cell exists on the frequency at which a measurement object of the measurement assignment is, the serving cell corresponding to the measurement assignment is the existing primary serving cell or secondary serving cell; when a measurement event corresponding to the measurement assignment is the fourth measurement event, and the primary serving cell and the secondary serving cell do not exist on the frequency at which the measurement object of the measurement assignment is, the serving cell corresponding to the measurement assignment is the primary serving cell; wherein the fourth measurement event can be identified by an LTE device and an LTE-A device.

Preferably, during the mobile terminal determining a cell to be measured corresponding to the received measurement assignment: when a measurement event corresponding to the measurement assignment is a fifth measurement event, the serving cell corresponding to the measurement assignment is a primary serving cell, wherein the fifth measurement event can be identified by an LTE device and a LTE-A device; and when a measurement event corresponding to the measurement assignment is a sixth measurement event, the serving cell corresponding to the measurement assignment is a secondary serving cell, wherein the sixth measurement event can only be identified by an LTE-A device.

Preferably, when the measurement event corresponding to the measurement assignment is the sixth measurement event, the measurement object corresponding to the measurement assignment is at the same frequency as the secondary serving cell.

In the embodiments of the present invention, the UE acquires one or more configured measurement reference component carriers. The embodiments mainly relate to measurement events of comparison type, namely the triggering of the event (referred to as entry condition in the protocol) is determined by wireless signals of a reference cell (serving cell) and a neighbour cell, for example, in the LTE, the measurement event above comprises A3, A5 and B2 events, as shown in the table below:

TABLE 1

| event | triggering condition (entry condition) |
|---|---|
| A3 (the neighbour cell becomes better than the serving cell by an offset) | $Mn + Ofn + Ocn - Hys > Ms + Ofs + Ocs + Off$ |
| A5 (the serving cell becomes lower than threshold 1, and the neighbour cell becomes better than threshold 2) | $Ms + Hys < Thresh1$ and $Mn + Ofn + Ocn - Hys > Thresh2$ |
| B2 (the serving cell is lower than threshold 1, and an inter-RAT neighbor cell becomes better than threshold 2) | $Ms + Hys < Thresh1$ and $Mn + Ofn + Ocn - Hys > Thresh2$ |

The embodiments of the above configuration methods will be described in detail hereinafter taking A3 event as an example. Those skilled in the art can understand that the following solutions are also applicable to A5, B2 and other comparison events subsequently introduced.

Embodiment 1

On the basis of the existing newly defined A3-PCC event, the explanation of A3 event is re-modified, and when the UE works, moving from single carrier to multi-carrier or from multi-carrier to single carrier, it is necessary to perform mutual conversion between A3 and A3-PCC.

In the present embodiment, the definitions of A3-PCC and A3 events are as shown in the table below:

TABLE 2

| event | triggering condition (entry condition) | parameter explanation |
|---|---|---|
| A3-PCC (the neighbour cell becomes better than the primary serving cell by one offset) | Mn + Ofn + Ocn − Hys > Ms + Ofs + Ocs + Off | the serving cell is Pcell |
| A3 (the neighbour cell becomes better than the serving cell by one offset) | Mn + Ofn + Ocn − Hys > Ms + Ofs + Ocs + Off | when working in the multi-carrier aggregation state, the serving cell is the serving cell (Pcell or Scell) on the frequency which the neighbour cell is at, or can only be Scell. |

In the above table, when working in the multi-carrier aggregation state, the serving cell is the serving cell on the frequency which the neighbour cell is at, or can only be Scell, it is indicated that: the serving cell can be a primary serving cell or a secondary serving cell, or can only be a secondary serving cell (Scell).

As described in the above table, according to the requirement in Background of the Invention, the newly defined A3-PCC event is that the neighbour cell is better than the primary serving cell by one offset, wherein Ms, Ofs, and Ocs are measurement amount of Pcell, frequency offset of Pcell, and cell offset of Pcell respectively.

To modify the original A3 event, there are different explanations for the UE in different states. When the UE is in non-carrier aggregation state, namely the UE only has one serving cell, it can be deemed that there is only Pcell, but no Scell, the A3 event is that the neighbour cell is better than the only serving cell by one offset, and the explanation is the same as the original explanation of the A3 event in the LTE. When the UE is in carrier aggregation state, namely the UE has more than one serving cells, Pcell and at least one Scell. At this time, when the measurement object corresponding to one A3 event is the frequency which one serving cell is at, the A3 event selects the serving cell to provide a comparison parameter for the event triggering condition.

Figure 4:
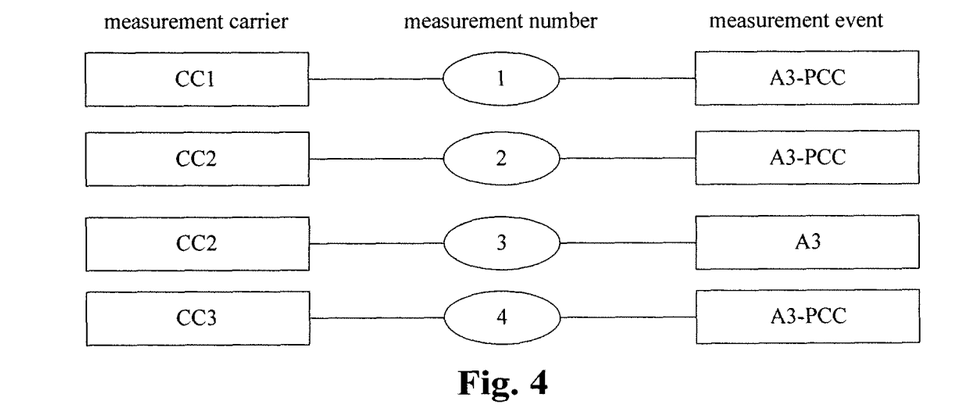
FIG. 4 is a preferred schematic diagram of the configuration of the measurement assignment in a multi-carrier system according to an embodiment of the present invention.

As shown in FIG. 4, the UE works in the multi-carrier state, wherein CC1 is the frequency which the Pcell is at, CC2 is the frequency which the Scell1 is at, CC3 is the frequency which the neighbour cell is at, and four measurement assignments are configured, which are specifically shown in the table below:

TABLE 3

| MID | MO | RC | serving cell | neighbour cell |
|---|---|---|---|---|
| 1 | CC1 | A3-PCC | Pcell | neighbour cell on CC1 |
| 2 | CC2 | A3-PCC | Pcell | neighbour cell on CC2 and Scell1 |
| 3 | CC2 | A3 | Scell1 | neighbour cell on CC2 |
| 4 | CC3 | A3-PCC | Pcell | neighbour cell on CC3 |

Preferably, in the above scene, when the UE works moving from single carrier to multi-carrier or from multi-carrier to single carrier, it is necessary to perform mutual conversion between A3 and A3-PCC. That is, A3-PCC is only for the multi-carrier state, namely it is only used when there are multiple serving cells, at this time, and the A3 event is explained as a same frequency comparison event of Scell. When the UE returns to the single carrier state, only the A3 event is used, and the explanation thereof is the same as that in the LTE.

Examples will be given hereinafter in two scenes of from multi-carrier to single carrier and from single carrier to multi-carrier.

Scene 1: the UE is configured from multi-carrier to single carrier, the Scell1 is deleted, thus the corresponding measurement assignment with the Scell as the serving cell is also deleted, namely the measurement assignment 3 is deleted, the deletion can be made by: the base station deletes the measurement assignment 3 through the indication in a deletion reconfiguration message, or the UE automatically deletes the measurement assignment 3 corresponding to the Scell according to the reconfiguration of the base station, preferably, the deletion of the measurement assignment can be the deletion of MID. The above measurement assignments are changed as shown in the table below:

TABLE 4

| MID | MO | RC | serving cell | neighbour cell |
|---|---|---|---|---|
| 1 | CC1 | A3-PCC | Pcell | neighbour cell on CC1 |
| 2 | CC2 | A3-PCC | Pcell | neighbour cell on CC2 (Scell1 has become a neighbour cell) |
| 4 | CC3 | A3-PCC | Pcell | neighbour cell on CC3 |

In order to ensure the backward compatibility of the UE and the consistency with the LIE in the single carrier state, the A3-PCC event needs to be converted to A3 event, namely the UE shall not use the A3-PCC event in the single carrier state. The A3-PCC event can be reconfigured to the A3 event through an explicit reconfiguration message of the network side, such as an RRC reconfiguration message, when the last Scell is deleted to enter the single carrier state. In the single carrier state, the explanation of A3 event is the same as that in the LTE. Alternatively, the UE can implicitly automatically converts or explains the A3-PCC event to the A3 event of the LTE according to the state change of the UE, after the last Scell (namely Scell1) is deleted, as shown in the table below:

TABLE 5

| MID | MO | RC | serving cell | neighbour cell |
|-----|-----|-----|--------------|----------------|
| 1 | CC1 | A3 | Pcell | neighbour cell on CC1 |
| 2 | CC2 | A3 | Pcell | neighbour cell on CC2 (at this time, the Scell has become a neighbour cell) |
| 4 | CC3 | A3 | Pcell | neighbour cell on CC3 |

Figure 5:
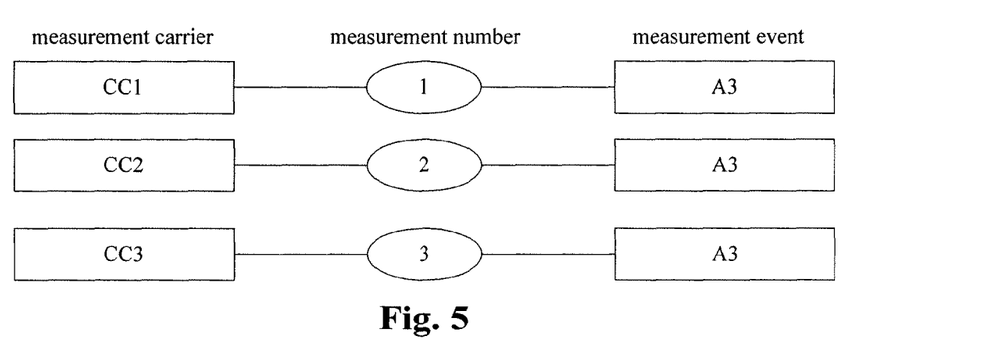
FIG. 5 is another preferred schematic diagram of the configuration of the measurement assignment in a multi-carrier system according to an embodiment of the present invention.

Scene 2: when the UE is in the single carrier state, the configuration is as shown in FIG. 5, CC1 is the frequency which the serving cell is at, the network reconfigures the UE to the multi-carrier state based on a internal algorithm (for example, the service increase of the UE), wherein CC1 is Pcell, CC2 is Scell1, a same frequency measurement assignment 4 on Scell is added, as shown in the table below. At this time, the A3 event of the original measurement assignments 1, 2, and 3 needs to be converted to A3-PCC event. Similarly, the conversion from A3 to A3-PCC can also use the network explicit reconfiguration, or the UE implicit automatic conversion as described in Scene 1.

TABLE 6

| MID | MO | RC | serving cell | neighbour cell |
|-----|-----|-----|--------------|----------------|
| 1 | CC1 | A3-PCC | Pcell | neighbour cell on CC1 |
| 2 | CC2 | A3-PCC | Pcell | neighbour cell on CC2 (comprising Scell1) |
| 3 | CC3 | A3-PCC | Pcell | neighbour cell on CC3 |
| 4 | CC2 | A3 | Scell | neighbour cell on CC2 (not comprising Scell1) |

Embodiment 2

No new event is defined, and A3 events are classified into A3 events corresponding to Scell and A3 events corresponding to Pcell.

In the present embodiment, no new event is defined, and the A3 events in the LTE are classified into A3 events corresponding to Scell and A3 events corresponding to Pcell. The UE configures measurement assignments of four A3 events according to the configuration shown in FIG. 6. Moreover, the four A3 events are divided into groups in an explicit manner (for instance, the network indicates through a reconfiguration signaling) or an implicit manner (reserving some assignments for Pcell, and the other assignments are assignments of Scell, or vice versa), 1, 2 and 3 attribute to Pcell, and 4 attributes to Scell1. The measurement assignments of Pcell can be configured according to the manner of LTE, namely it can be considered as a defaulted group. The measurement assignment of Scell is configured through a newly added group cell, so as to ensure the backward compatibility, namely return to the LTE base station, the newly added cell can be neglected as it cannot be identified. When a state change from multi-carrier to single carrier or a state change from single carrier to multi-carrier occurs, it is only necessary to delete or add measurement assignment information attributing to Scell. In the present embodiment, the cell to which the measurement assignment attributes is the serving cell of the measurement assignment. According to the groups, the four measurement assignments can be explained as shown in the table below:

TABLE 7

| MID | MO | RC | group | serving cell | neighbour cell |
|-----|-----|-----|-------|--------------|----------------|
| 1 | CC1 | A3 | defaulted configuration (group 0) | Pcell | neighbour cell on CC1 |
| 2 | CC2 | A3 | configuration (group 0) | Pcell | neighbour cell on CC2 (comprising Scell1) |
| 3 | CC3 | A3 | | Pcell | neighbour cell on CC3 |
| 4 | CC2 | A3 | new group 1 | Scell1 | neighbour cell on CC2 (not comprising Scell1) |

Embodiment 3

A3-SCC-Pcell event is newly defined, to enable a neighbour cell at the frequency which Scell is at to be better than Pcell by one offset, and the existing A3 event is explained as: a neighbour cell at the frequency which Pcell is at or at a non-configuration frequency is better than Pcell by a offset, or a neighbour cell at the frequency which Scell is at is better than Scell by one offset.

For the event of comparison type, such as the serving cell of A3 event, it is determined by the stipulated rule, which is as follows: when there is Pcell or Scell at the frequency of the corresponding measurement object, Pcell or Scell is taken as the serving cell for event triggering, in this scene, the neighbour cell is the cell other than the serving cell; and when there is no Pcell or Scell at the frequency of the corresponding measurement object, Pcell is taken as the serving cell for event triggering. The detailed description of the measurement events in the present embodiment is shown in the table below:

TABLE 8

| event | triggering condition (entry condition) | serving cell |
|-------|----------------------------------------|--------------|
| A3-SCC-Pcell (the neighbour cell becomes better than the primary serving cell by one offset) | Mn + Ofn + Ocn − Hys > Ms + Ofs + Ocs + Off | The neighbour cell is at the frequency which Scell is at, and the serving cell is Pcell. |
| A3 (the neighbour cell becomes better than the serving cell by one offset) | Mn + Ofn + Ocn − Hys > Ms + Ofs + Ocs + Off | The serving cell is: when there is Pcell or Scell at the frequency of the corresponding measurement object, the cell is taken as the serving cell for event triggering; and when there is no Pcell or Scell at the frequency of the corresponding measurement object, the Pcell is taken as the serving cell for event triggering. The neighbour cell is the neighbour cell on the measurement object. |

Figure 6:
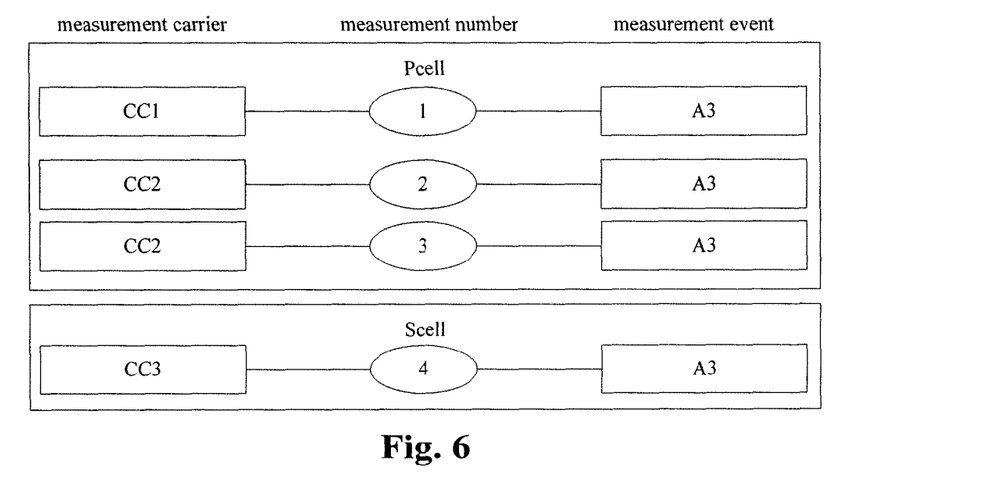
FIG. 6 is a further preferred schematic diagram of the configuration of the measurement assignment in a multi-carrier system according to an embodiment of the present invention.

As shown in FIG. 6, for the measurement assignment in which the measurement object is the frequency which Scell is at and the serving cell is Pcell, A3-SCC-Pcell is used. Each measurement assignment is shown in the table below:

TABLE 9

| MID | MO | RC | serving cell | neighbour cell |
|---|---|---|---|---|
| 1 | CC1 | A3 | Pcell | neighbour cell on CC1 |
| 2 | CC2 | A3-SCC-Pcell | Pcell | neighbour cell on CC2 (comprising Scell1) |
| 3 | CC3 | A3 | Pcell | neighbour cell on CC3 |
| 4 | CC2 | A3 | Scell1 | neighbour cell on CC2 (not comprising Scell1) |

Like embodiment 1, further, when the UE is in the reconfiguration process from multi-carrier to single carrier or from single carrier to multi-carrier, it is necessary to explicitly or implicitly convert A3-SCC-Pcell to A3 or convert A3 to A3-SCC-Pcell.

Embodiment 4

A3-SCC event is newly defined as that the neighbour cell at the frequency which Scellx is at is better than Scellx by one offset, namely A3-SCC can only be configured at the frequency which Scell is at, a neighbour cell thereof is a neighbour cell at the frequency which Scell is at, and the serving cell is Scell.

The existing A3 event is explained as follows: a neighbour cell at a certain frequency is better than Pcell by one offset, specifically as shown in the table below:

TABLE 10

| event | triggering condition (entry condition) | parameter explanation |
|---|---|---|
| A3-SCC (the neighbour cell becomes better than the secondary serving cell by one offset) | Mn + Ofn + Ocn − Hys > Ms + Oft + Ocs + Off | The neighbour cell is at the frequency which Scell is at, and the serving cell is Scell. |
| A3 (the neighbour cell becomes better than the primary serving cell by one offset) | Mn + Ofn + Ocn − Hys > Ms + Ofs + Ocs + Off | The neighbour cell is at the frequency indicated by the measurement object, and the serving cell is Pcell. |

Figure 7:
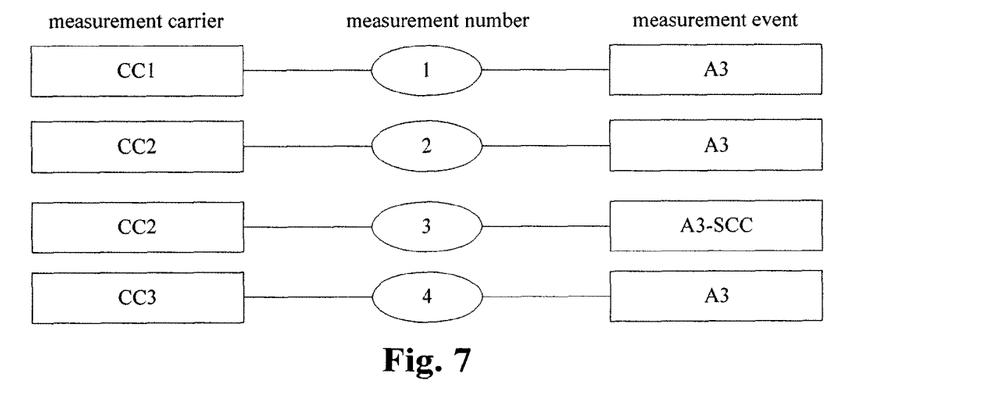
FIG. 7 is a still further preferred schematic diagram of the configuration of the measurement assignment in a multi-carrier system according to an embodiment of the present invention.

As shown in FIG. 7, the corresponding measurement assignments are configured, which are specifically shown in the table below:

TABLE 11

| MID | MO | RC | serving cell | neighbour cell |
|---|---|---|---|---|
| 1 | CC1 | A3 | Pcell | neighbour cell on CC1 |
| 2 | CC2 | A3 | Pcell | neighbour cell on CC2 (comprising Scell1) |
| 3 | CC3 | A3 | Pcell | neighbour cell on CC3 |
| 4 | CC2 | A3-SCC | Scell1 | neighbour cell on CC2 (not comprising Scell1) |

When a state change from multi-carrier to single carrier or a state change from single carrier to multi-carrier occurs, it is only necessary to delete or add Scell and measurement assignment information corresponding to A3-SCC, as described in embodiment 1/2, the deletion of measurement assignment can be made by: the network explicitly indicates, in a reconfiguration message, deleting the corresponding measurement assignment while indicating deleting Scell; or the UE implicitly deletes A3-SCC measurement assignment corresponding to the Scell while deleting Scell according to the indication of the network.

When the events involved are measurement events of the serving cell of non-comparison type, A1 and A2 are comprised, as shown in the table below:

TABLE 12

| Event | triggering condition (entry condition) |
|---|---|
| A1 (the serving cell becomes better than a threshold) | Ms − Hys > Thresh |
| A2 (the serving cell becomes worse than a threshold) | Ms + Hys < Thresh |

The serving cell is a serving cell on the frequency of the measurement object corresponding to the measurement assignment, namely when the measurement assignment is corresponding to A1/2 event, the serving cell is a serving cell on the frequency of the measurement object. As shown in the table below, the measurement assignments 1, 2 are corresponding to A1 and A2 events respectively, the serving cell is a serving cell on the measurement object CC1, which is Pcell in the present embodiment. Similarly, it can be acquired that the serving cell of the measurement assignments 3 and 4 is Scell.

TABLE 13

| MID | MO | RC | serving cell |
|---|---|---|---|
| 1 | CC1 | A1 | Pcell |
| 2 | CC1 | A2 | Pcell |
| 3 | CC2 | A1 | Scell1 |
| 4 | CC2 | A2 | Scell1 |

In addition, the present invention further provides a preferred embodiment of the method for processing a measurement event in a multi-carrier system. In the preferred embodiment, the method for processing a measurement event comprises the following steps:

S1, a mobile terminal measures a wireless signal of a neighbour cell and a serving cell corresponding to a measurement event, wherein the serving cell corresponding to the measurement event is a secondary serving cell, and the secondary serving cell and the neighbour cell are at the same frequency; and S2, when the wireless signal quality of the neighbour cell is higher than the wireless signal quality of the serving cell, the measurement event is triggered.

In the traditional art, as single carrier only relates to one serving cell, the relevant measurement event is only related to the serving cell. However, after the introduction of the carrier aggregation technology, the related art cannot meet the requirements, namely the existing measurement configuration cannot distinguish whether the corresponding serving cell is a primary serving cell or a secondary serving cell. Looking back to the embodiment of the present invention, by configuring different measurement events and measurement assignments for the primary serving cell and the secondary serving cell, the mobile terminal can determine the serving cell corresponding to the measurement assignment, thus the mobile terminal can implement measurement and reporting under the configuration of multiple serving cells.

Preferably, after the measurement event is triggered, the method further comprises: when a measurement result of the measurement event meet a report condition, the mobile terminal reports the measurement result.

Preferably, before measuring the neighbour cell and the serving cell, the mobile terminal acquires the measurement configuration transmitted by the network side device through a dedicated signaling, wherein the measurement configuration comprises: measurement assignment. The measurement assignment corresponds to the measurement event.

Preferably, before measuring the neighbour cell and the serving cell, the mobile terminal consults with the network side and configures different measurement events and the corresponding measurement assignments for the primary serving cell and the secondary serving cell. In the present preferred embodiment, the mobile terminal can determine the serving cell corresponding to the measurement assignment and/or measurement event, thus the mobile terminal can implement measurement and reporting under the configuration of multiple serving cells.

Preferably, in the present preferred embodiment, the steps of the mobile terminal determining the serving cell corresponding to the measurement assignment and/or the measurement event can be learned with reference to the embodiments as shown in FIGS. 3-7, here will not describe it redundantly.

Preferably, in the present preferred embodiment, the reconfiguration process of the measurement configurations also can be learned with reference to the embodiments as shown in FIGS. 3-7, here will not describe it redundantly.

Figure 8:
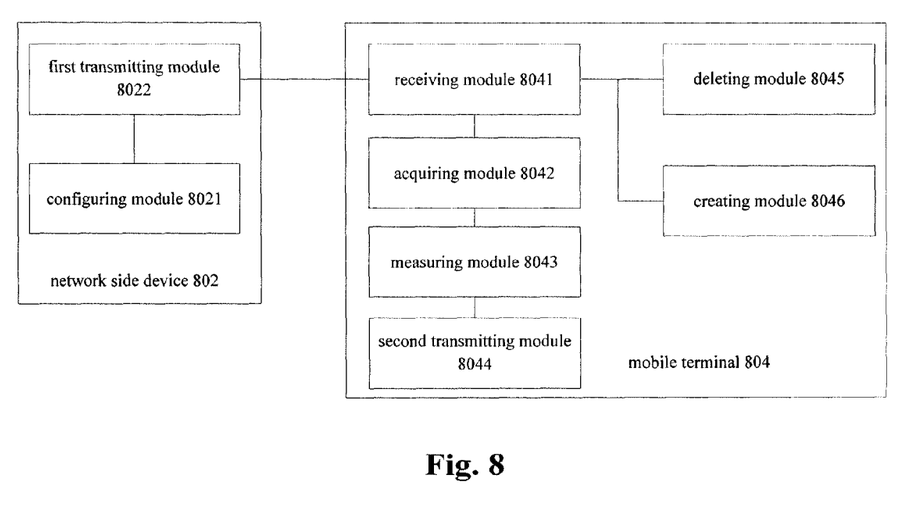
FIG. 8 is a schematic diagram of a system for processing a measurement event in a multi-carrier system according to an embodiment of the present invention.

The present invention further provides an embodiment of a system for processing a measurement event in a multi-carrier system. FIG. 8 is a schematic diagram of the system for processing a measurement event in a multi-carrier system according to an embodiment of the present invention. As shown in FIG. 8, the system for processing a measurement event in a multi-carrier system comprises: a network side device 802 and a mobile terminal 804.

Preferably, the network side device 802 comprises: a configuring module 8021 and a first transmitting module 8022.

Preferably, the mobile terminal 804 comprises: a receiving module 8041, an acquiring module 8042, a measuring module 8043 and a second transmitting module 8044.

In the working state, the configuring module 8021 configures a measurement assignment of a primary serving cell and a measurement assignment of a secondary serving cell, and then, the first transmitting module 8022 transmits the configured measurement assignments to the mobile terminal, for the mobile terminal to measure and report.

The receiving module 8041 receives the configured measurement assignments transmitted by the first transmitting module 8022, and then the acquiring module 8042 acquires a cell (or cells) to be measured corresponding to the received measurement assignment, wherein the cell(s) to be measured is a serving cell, or a serving cell and a neighbour cell, for example, in the present preferred embodiment, the cells to be measured can be a serving cell and a neighbour cell. Then, the measuring module 8043 measures the acquired cell to be measured; and the second transmitting module 8044 reports a measurement result when the measurement result meets a report condition of the event corresponding to the received measurement assignment.

In the embodiment of the present invention, by configuring different measurement events and measurement assignments for the primary serving cell and the secondary serving cell, the mobile terminal can determine the serving cell corresponding to the measurement assignment, thus the mobile terminal can implement measurement and reporting under the configuration of multiple serving cells.

The acquiring module 8042 acquiring a cell (or cells) to be measured corresponding to the received measurement assignment can comprise at least one of the following:

1) when a measurement event corresponding to the measurement assignment is a first measurement event, the serving cell corresponding to the measurement assignment is a primary serving cell, wherein the first measurement event can only be identified by an LTE-A device; and when a measurement event corresponding to the measurement assignment is a second measurement event and the mobile terminal works in the multi-carrier aggregation state, the serving cell corresponding to the measurement assignment is a secondary serving cell, wherein the second measurement event can be identified by an LTE device and an LTE-A device.

Preferably, a measurement object of the measurement assignment corresponding to the second measurement event is at the same frequency with the secondary serving cell; and when a measurement event corresponding to the measurement assignment is a second measurement event and the mobile terminal works in the single carrier aggregation state, the serving cell corresponding to the measurement assignment is a primary serving cell.

2) when the received measurement assignment is a measurement assignment of a first kind, the serving cell corresponding to the measurement assignment is a primary serving cell; when the received measurement assignment is a measurement assignment of a second kind, the serving cell corresponding to the measurement assignment is a secondary serving cell; wherein the network side device configures the measurement assignment of the first kind related to the primary serving cell and the measurement assignment of the second kind related to the secondary serving cell according to the measurement event, the measurement event corresponding to the measurement assignment of the first kind can be identified by an LTE device and an LTE-A device, and the measurement event corresponding to the measurement of the second kind assignment can only be identified by an LTE-A device.

3) when a measurement event corresponding to the measurement assignment is a third measurement event, the serving cell corresponding to the measurement assignment is a primary serving cell, wherein the third measurement event can only be identified by an LTE-A device; when a measurement event corresponding to the measurement assignment is a fourth measurement event, and a primary serving cell or a secondary serving cell exists on the frequency at which a measurement object of the measurement assignment is, the serving cell corresponding to the measurement assignment is the existing primary serving cell or secondary serving cell; when a measurement event corresponding to the measurement assignment is the fourth measurement event, and the primary serving cell and the secondary serving cell do not exist on the frequency at which the measurement object of the measurement assignment is, the serving cell corresponding to the measurement assignment is the primary serving cell; wherein the fourth measurement event can be identified by an LTE device and an LTE-A device.

4) when a measurement event corresponding to the measurement assignment is a fifth measurement event, the serving cell corresponding to the measurement assignment is a primary serving cell, wherein the fifth measurement event can be identified by an LTE device and a LTE-A device; and when a measurement event corresponding to the measurement assignment is a sixth measurement event, the serving cell corresponding to the measurement assignment is a secondary serving cell, wherein the sixth measurement event can only be identified by an LTE-A device.

Through the above four manners, the existing measurement event is expanded, the impact on the LTE protocol is reduced, the modification to the protocol and the processing on the terminal are simplified as much as possible, and at the same time, the backward compatibility of the LTE system is ensured.

Preferably, the mobile terminal 804 further comprises: a deleting module 8045 and a creating module 8046.

In the working state, the acquiring module 8042 receives a reconfiguration message transmitted by the network side device 802. The mobile terminal 804 performs carrier reconfiguration according to the reconfiguration message. When the mobile terminal is configured from multi-carrier to single carrier, the deleting module 8045 deletes the measurement assignment corresponding to the second measurement event; and when the mobile terminal is configured from single carrier to multi-carrier, the creating module 8046 creates the measurement assignment corresponding to the second measurement event.

It should be noted that the steps shown in the flow chart in the drawings can be implemented in, for example, a computer system with a group of computer executable instructions. Moreover, although the logical order is shown in the flow chart, in some cases, the steps shown or described can be implemented in a different order.

Apparently, those skilled in the art shall understand that the above-mentioned modules and steps of the present invention can be realized by using a general purpose calculating device, can be integrated in one calculating device or distributed on a network which consists of a plurality of calculating devices, and alternatively they can be realized by using the executable program code of the calculating device, so that consequently they can be stored in the storing device and executed by the calculating device, or they may be made into an integrated circuit module respectively, or a plurality of modules or steps thereof may be made into one integrated circuit module. In this way, the present invention is not limited to any particular combination of hardware and software.

The above description is only to illustrate the preferred embodiments but not to limit the present invention. Various alternative and changes to the present invention are apparent to those skilled in the art. The scope defined in claims shall comprise any modification, equivalent substitution and improvement within the spirit and principle of the present invention.

The invention claimed is:

1. A method for processing a measurement event in a multi-carrier system, comprising:
    a mobile terminal receives a measurement assignment which is configured and transmitted by a network side device;
    the mobile terminal determines a neighbor cell and a serving cell corresponding to the received measurement assignment, and the mobile terminal measures the determined neighbor cell and serving cell; and
    when a measurement result meets a report condition of a measurement event corresponding to the received measurement assignment, the mobile terminal reports the measurement result;
    wherein the step of the mobile terminal determining a neighbor cell and a serving cell corresponding to the received measurement assignment comprises:
        when a measurement event corresponding to the measurement assignment is a first measurement event, the serving cell corresponding to the measurement assignment is a primary serving cell, wherein the first measurement event can only be identified by an advanced long-term evolution (LTE-A) device; and
        when a measurement event corresponding to the measurement assignment is a second measurement event and the mobile terminal works in the multi-carrier aggregation state, the serving cell corresponding to the measurement assignment is a secondary serving cell, wherein the second measurement event can be identified by a long-term evolution (LTE) device and an LTE-A device; or
    wherein the step of the mobile terminal determining a neighbor cell and a serving cell corresponding to the received measurement assignment comprises:
        when the received measurement assignment is a measurement assignment of a first kind, the serving cell corresponding to the measurement assignment is a primary serving cell;
        when the received measurement assignment is a measurement assignment of a second kind, the serving cell corresponding to the measurement assignment is a secondary serving cell;
        wherein the network side device configures the measurement assignment of the first kind related to the primary serving cell and the measurement assignment of the second kind related to the secondary serving cell according to the measurement event, the measurement event corresponding to the measurement assignment of the first kind can be identified by an LTE device and an LTE-A device, and the measurement event corresponding to the measurement assignment of the second kind can only be identified by an LTE-A device; or
    wherein the step of the mobile terminal determining a neighbor cell and a serving cell corresponding to the received measurement assignment comprises:
        when a measurement event corresponding to the measurement assignment is a third measurement event, the serving cell corresponding to the measurement assignment is a primary serving cell, wherein the third measurement event can only be identified by an LTE-A device;
        when a measurement event corresponding to the measurement assignment is a fourth measurement event, and a primary serving cell or a secondary serving cell exists on the frequency at which a measurement object of the measurement assignment is, the serving cell corresponding to the measurement assignment device is the existing primary serving cell or secondary serving cell;
        when a measurement event corresponding to the measurement assignment is the fourth measurement event, and the primary serving cell and the secondary serving cell do not exist on the frequency at which the measurement object of the measurement assignment is, the serving cell corresponding to the measurement assignment is the primary serving cell,
        wherein the fourth measurement event can be identified by an LTE device and an LTE-A device; or
    wherein the step of the mobile terminal determining a neighbor cell and a serving cell corresponding to the received measurement assignment comprises:
        when a measurement corresponding to the measurement assignment is a fifth measurement event, the serving cell corresponding to the measurement assignment is a primary serving cell, wherein the fifth measurement event can be identified by an LTE device and an LTE-A device; and when a measurement event corresponding to the measurement assignment is a sixth measurement event, the serving cell corresponding to the measurement assignment is a secondary serving cell, wherein the sixth measurement event can only be identified by an LTE-A device.

2. The method according to claim 1, wherein the serving cell is a primary serving cell or a secondary serving cell.

3. The method according to claim 1, wherein the step of the mobile terminal determining a neighbor cell and a serving cell corresponding to the received measurement assignment comprises:

when a measurement event corresponding to the measurement assignment is a first measurement event, the serving cell corresponding to the measurement assignment is a primary serving cell, wherein the first measurement event can only be identified by an advanced long-term evolution (LTE-A) device; and when a measurement event corresponding to the measurement assignment is a second measurement event and the mobile terminal works in the multi-carrier aggregation state, the serving cell corresponding to the measurement assignment is a secondary serving cell, wherein the second measurement event can be identified by a long-term evolution (LTE) device and an LTE-A device.

4. The method according to claim 3, wherein a measurement object of the measurement assignment corresponding to the second measurement event is at the same frequency with the secondary serving cell; and when a measurement event corresponding to the measurement assignment is a second measurement event and the mobile terminal works in the single carrier aggregation state, the serving cell corresponding to the measurement assignment is a primary serving cell.

5. The method according to claim 3, wherein the method further comprises the steps that:

the mobile terminal receives a reconfiguration message transmitted by the network side device; and when the mobile terminal is configured from multi-carrier to single carrier, the measurement assignment corresponding to the second measurement event is deleted; or when the mobile terminal is configured from single carrier to multi-carrier, a measurement assignment corresponding to the second measurement event is added according to the reconfiguration message indication.

6. The method according to claim 5, wherein after the mobile terminal receives a reconfiguration message transmitted by the network side device, the method further comprises: when the mobile terminal is configured from multi-carrier to single carrier, the second measurement event is modified to the first measurement event.

7. The method according to claim 1, wherein the step of the mobile terminal determining a neighbor cell and a serving cell corresponding to the received measurement assignment comprises:

when the received measurement assignment is a measurement assignment of a first kind, the serving cell corresponding to the measurement assignment is a primary serving cell;

when the received measurement assignment is a measurement assignment of a second kind, the serving cell corresponding to the measurement assignment is a secondary serving cell, wherein the network side device configures the measurement assignment of the first kind related to the primary serving cell and the measurement assignment of the second kind related to the secondary serving cell according to the measurement event, the measurement event corresponding to the measurement assignment of the first kind can be identified by an LTE device and an LTE-A device, and the measurement event corresponding to the measurement assignment of the second kind can only be identified by an LTE-A device.

8. The method according to claim 7, wherein the method further comprises the steps that:

the mobile terminal receives a reconfiguration message transmitted by the network side device; and when the mobile terminal is configured from multi-carrier to single carrier, the measurement assignment of the second kind is deleted; or when the mobile terminal is configured from single carrier to multi-carrier, the measurement assignment of the second kind is added according to the reconfiguration message indication.

9. The method according to claim 1, wherein in the step of the mobile terminal determining a neighbor cell and a serving cell corresponding to the received measurement assignment:

when a measurement event corresponding to the measurement assignment is a third measurement event, the serving cell corresponding to the measurement assignment is a primary serving cell, wherein the third measurement event can only be identified by an LTE-A device;

when a measurement event corresponding to the measurement assignment is a fourth measurement event, and a primary serving cell or a secondary serving cell exists on the frequency at which a measurement object of the measurement assignment is, the serving cell corresponding to the measurement assignment is the existing primary serving cell or secondary serving cell;

when a measurement event corresponding to the measurement assignment is the fourth measurement event, and the primary serving cell and the secondary serving cell do not exist on the frequency at which the measurement object of the measurement assignment is, the serving cell corresponding to the measurement assignment is the primary serving cell, wherein the fourth measurement event can be identified by an LTE device and an LTE-A device.

10. The method according to claim 1, wherein in the step of the mobile terminal determining a neighbor cell and a serving cell corresponding to the received measurement assignment:

when a measurement event corresponding to the measurement assignment is a fifth measurement event, the serving cell corresponding to the measurement assignment is a primary serving cell, wherein the fifth measurement event can be identified by an LTE device and a LTE-A device; and when a measurement event corresponding to the measurement assignment is a sixth measurement event, the serving cell corresponding to the measurement assignment is a secondary serving cell, wherein the sixth measurement event can only be identified by an LTE-A device.

11. The method according to claim 10, wherein when the measurement event corresponding to the measurement assignment is the sixth measurement event, the measurement object corresponding to the measurement assignment is at the same frequency as the secondary serving cell; and wherein when the wireless signal quality of the neighbor cell becomes higher than the wireless signal quality of the serving cell, the measurement event is triggered.

12. The method according to claim 11, wherein after the measurement event is triggered, the method further comprises:
when a measurement result of the measurement event meets a report condition, the mobile terminal reports the measurement result.

13. A system for processing a measurement event in a multi-carrier system, comprising a network side device and a mobile terminal, wherein
the network side device comprises:
a configuring processor, configured to configure a measurement assignment of a primary serving cell and a measurement assignment of a secondary serving cell; and
a first transmitting processor, connected with the configuring processor and configured to transmit the configured measurement assignments to a mobile terminal, for the mobile terminal to measure and report;
wherein the mobile terminal comprises:
a receiving processor, configured to receive the configured measurement assignments transmitted by the first transmitting processor;
an acquiring processor, connected with the receiving processor and configured to acquire a neighbour cell and a serving cell corresponding to the received measurement assignments;
a measuring processor, connected with the acquiring processor and configured to measure the determined neighbour cell and serving cell; and
a second transmitting processor, connected with the measuring processor and configured to report a measurement result when the measurement result meets a report condition of the event corresponding to the received measurement assignment;
wherein the acquiring processor acquiring the neighbor cell and the serving cell corresponding to the received measurement assignments comprises:
when a measurement event corresponding to the measurement assignment is a first measurement event, the serving cell corresponding to the measurement assignment is a primary serving cell, wherein the first measurement event can only be identified by an advanced long-term evolution (LTE-A) device; and
when a measurement event corresponding to the measurement assignment is a second measurement event and the mobile terminal works in the multi-carrier aggregation state, the serving cell corresponding to the measurement assignment is a secondary serving cell, wherein the second measurement event can be identified by a long-term evolution (LTE) device and an LTE-A device; or,
wherein the acquiring processor acquiring the neighbor cell and the serving cell corresponding to the received measurement assignments comprises:
when the received measurement assignment is a measurement assignment of a first kind, the serving cell corresponding to the measurement assignment is a primary serving cell;
when the received measurement assignment is a measurement assignment of a second kind, the serving cell corresponding to the measurement assignment is a secondary serving cell;
wherein the network side device configures the measurement assignment of the first kind related to the primary serving cell and the measurement assignment of the second kind related to the secondary serving cell according to the measurement event, the measurement event corresponding to the measurement assignment of the first kind can be identified by an LTE device and an LTE-A device, and the measurement event corresponding to the measurement assignment of the second kind can only be identified by an LTE-A device; or,
wherein the acquiring processor acquiring the neighbor cell and the serving cell corresponding to the received measurement assignments comprises:
when a measurement event corresponding to the measurement assignment is a third measurement event, the serving cell corresponding to the measurement assignment is a primary serving cell, wherein the third measurement event can only be identified by an LTE-A device;
when a measurement event corresponding to the measurement assignment is a fourth measurement event, and a primary serving cell or a secondary serving cell exists on the frequency at which a measurement object of the measurement assignment is, the serving cell corresponding to the measurement assignment is the existing primary serving cell or secondary serving cell;
when a measurement event corresponding to the measurement assignment is the fourth measurement event, and the primary serving cell and the secondary serving cell do not exist on the frequency at which the measurement object of the measurement assignment is, the serving cell corresponding to the measurement assignment is the primary serving cell,
wherein the fourth measurement event can be identified by an LTE device and an LTE-A device; or,
wherein the acquiring processor acquiring the neighbor cell and the serving cell corresponding to the received measurement assignments comprises:
when a measurement event corresponding to the measurement assignment is a fifth measurement event, the serving cell corresponding to the measurement assignment is a primary serving cell, wherein the fifth measurement event can be identified by an LTE device and a LTE-A device; and
when a measurement event corresponding to the measurement assignment is a sixth measurement event, the serving cell corresponding to the measurement assignment is a secondary serving cell, wherein the sixth measurement event can only be identified by an LTE-A device.

14. The system according to claim 13, wherein the acquiring processor acquiring the neighbor cell and the serving cell corresponding to the received measurement assignments comprises:
when a measurement event corresponding to the measurement assignment is a first measurement event, the serving cell corresponding to the measurement assignment is a primary serving cell, wherein the first measurement event can only be identified by an advanced long-term evolution (LTE-A) device; and
when a measurement event corresponding to the measurement assignment is a second measurement event and the mobile terminal works in the multi-carrier aggregation state, the serving cell corresponding to the measurement assignment is a secondary serving cell, wherein the second measurement event can be identified by a long-term evolution (LTE) device and an LTE-A device.

15. The system according to claim 13, wherein the acquiring processor acquiring the neighbor cell and the serving cell corresponding to the received measurement assignments comprises:
  when the received measurement assignment is a measurement assignment of a first kind, the serving cell corresponding to the measurement assignment is a primary serving cell;
  when the received measurement assignment is a measurement assignment of a second kind, the serving cell corresponding to the measurement assignment is a secondary serving cell;
  wherein the network side device configures the measurement assignment of the first kind related to the primary serving cell and the measurement assignment of the second kind related to the secondary serving cell according to the measurement event, the measurement event corresponding to the measurement assignment of the first kind can be identified by an LTE device and an LTE-A device, and the measurement event corresponding to the measurement assignment of the second kind can only be identified by an LTE-A device.

16. The system according to claim 13, wherein the acquiring processor acquiring the neighbor cell and the serving cell corresponding to the received measurement assignments comprises:
  when a measurement event corresponding to the measurement assignment is a third measurement event, the serving cell corresponding to the measurement assignment is a primary serving cell, wherein the third measurement event can only be identified by an LTE-A device;
  when a measurement event corresponding to the measurement assignment is a fourth measurement event, and a primary serving cell or a secondary serving cell exists on the frequency at which a measurement object of the measurement assignment is, the serving cell corresponding to the measurement assignment is the existing primary serving cell or secondary serving cell;
  when a measurement event corresponding to the measurement assignment is the fourth measurement event, and the primary serving cell and the secondary serving cell do not exist on the frequency at which the measurement object of the measurement assignment is, the serving cell corresponding to the measurement assignment is the primary serving cell,
  wherein the fourth measurement event can be identified by an LTE device and an LTE-A device.

17. The system according to claim 13, wherein the acquiring processor acquiring the neighbor cell and the serving cell corresponding to the received measurement assignments comprises:
  when a measurement event corresponding to the measurement assignment is a fifth measurement event, the serving cell corresponding to the measurement assignment is a primary serving cell, wherein the fifth measurement event can be identified by an LTE device and a LTE-A device; and
  when a measurement event corresponding to the measurement assignment is a sixth measurement event, the serving cell corresponding to the measurement assignment is a secondary serving cell, wherein the sixth measurement event can only be identified by an LTE-A device.

* * * * *